| (12) | United States Patent | (10) Patent No.: US 11,617,003 B2 |
|---|---|---|
| | Choi et al. | (45) Date of Patent: Mar. 28, 2023 |

(54) DISPLAY DEVICE AND CONTROL METHOD THEREFOR

(71) Applicant: SAMSUNG ELECTRONICS CO., LTD., Suwon-si (KR)

(72) Inventors: Nak-won Choi, Gwangmyeong-si (KR); Young-kwang Seo, Suwon-si (KR); Eun-seok Choi, Suwon-si (KR); Jin-hyuk Hong, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 540 days.

(21) Appl. No.: 16/330,441

(22) PCT Filed: Sep. 8, 2017

(86) PCT No.: PCT/KR2017/009865
§ 371 (c)(1),
(2) Date: Mar. 5, 2019

(87) PCT Pub. No.: WO2018/048239
PCT Pub. Date: Mar. 15, 2018

(65) Prior Publication Data
US 2021/0289252 A1 Sep. 16, 2021

(30) Foreign Application Priority Data
Sep. 12, 2016 (KR) ........................ 10-2016-0117387

(51) Int. Cl.
*H04N 21/431* (2011.01)
*H04N 5/50* (2006.01)
(Continued)

(52) U.S. Cl.
CPC ........... *H04N 21/4318* (2013.01); *H04N 5/50* (2013.01); *H04N 5/58* (2013.01); *H04N 5/60* (2013.01); *H04N 21/4402* (2013.01)

(58) Field of Classification Search
CPC .. H04N 21/4318; H04N 21/4402; H04N 5/50; H04N 5/58; H04N 5/60;
(Continued)

(56) References Cited

U.S. PATENT DOCUMENTS 7,050,121 B2 5/2006 Kim
8,350,814 B2 1/2013 Kim et al.
(Continued)

FOREIGN PATENT DOCUMENTS

CN 1558661 A 12/2004
EP 2 214 309 A1 8/2010
(Continued)

OTHER PUBLICATIONS

Communication dated Mar. 9, 2021, issued by the European Patent Office in counterpart European Application No. 17849123.9.
(Continued)

*Primary Examiner* — John W Miller
*Assistant Examiner* — Sean N. Haiem
(74) *Attorney, Agent, or Firm* — Sughrue Mion, PLLC

(57) ABSTRACT

A display device and a control method therefor are disclosed. According to the disclosure, the display device comprises: a sensor for sensing the surrounding environmental state; an inputter for receiving a user command for content conversion; an outputter for outputting content corresponding to the user command; and a processor for controlling the outputter such that screen brightness and/or audio output strength of second content corresponding to the user command is changed and outputted, when the user command is inputted, on the basis of the sensed surrounding environmental state and/or output information of currently outputted first content. Therefore, the display device can variously output an output of content image and/or audio according to the surrounding environmental state.

15 Claims, 10 Drawing Sheets

(51) Int. Cl.
   *H04N 5/58*     (2006.01)
   *H04N 5/60*     (2006.01)
   *H04N 21/4402*  (2011.01)
(58) Field of Classification Search
   CPC ............... G06F 3/0416; G09G 3/3406; G09G
                2330/022; G09G 2360/144; H04M 1/22;
                     H04M 1/67; H04M 2250/12; H04M
                                              2250/22
   USPC ........................................................ 725/116
   See application file for complete search history.

(56) References Cited

U.S. PATENT DOCUMENTS

| | | |
|---|---|---|
| 8,542,182 B2 | 9/2013 | Nakade |
| 8,698,727 B2 | 4/2014 | Herz et al. |
| 8,711,187 B2 | 4/2014 | Park et al. |
| 9,155,048 B2 | 10/2015 | Hong |
| 9,310,779 B2* | 4/2016 | Huh ...................... G04G 21/025 |
| 9,704,441 B2* | 7/2017 | Fiske ........................ G02F 1/21 |
| 11,122,235 B2 | 9/2021 | Choe et al. |
| 2002/0089611 A1 | 7/2002 | Kim |
| 2006/0221260 A1* | 10/2006 | Fujine .................... G09G 3/3611 |
| | | 348/706 |
| 2008/0165116 A1 | 7/2008 | Herz et al. |
| 2009/0295731 A1 | 12/2009 | Kim et al. |
| 2010/0027811 A1* | 2/2010 | Moon ...................... H03G 7/007 |
| | | 381/104 |
| 2011/0032286 A1* | 2/2011 | Takata .................. G09G 3/3648 |
| | | 345/690 |
| 2011/0234654 A1 | 9/2011 | Park et al. |
| 2012/0280921 A1* | 11/2012 | Kwon ........................ G09G 3/20 |
| | | 345/173 |
| 2014/0018132 A1 | 1/2014 | Hong |
| 2014/0269224 A1* | 9/2014 | Huh ...................... G04G 13/021 |
| | | 368/73 |
| 2015/0058877 A1* | 2/2015 | Lakkundi ............. H04N 21/439 |
| | | 725/19 |
| 2015/0310795 A1* | 10/2015 | Pantfoerder ......... G09G 3/2003 |
| | | 345/589 |
| 2016/0037195 A1 | 2/2016 | Shin et al. |
| 2016/0124537 A1* | 5/2016 | Kim ................. H04N 21/42224 |
| | | 345/173 |
| 2016/0225326 A1* | 8/2016 | Fiske ....................... G09G 5/06 |
| 2016/0291327 A1 | 10/2016 | Kim et al. |
| 2016/0378317 A1* | 12/2016 | Tian ................... G06K 9/00013 |
| | | 345/173 |
| 2017/0353689 A1* | 12/2017 | Choe ....................... H04N 5/58 |

FOREIGN PATENT DOCUMENTS

| | | |
|---|---|---|
| KR | 10-0396683 B1 | 9/2003 |
| KR | 10-0629529 B1 | 9/2006 |
| KR | 10-2009-0126142 A | 12/2009 |
| KR | 10-2010-0001200 A | 1/2010 |
| KR | 10-2010-0052592 A | 5/2010 |
| KR | 10-2012-0018824 A | 3/2012 |
| KR | 10-1144828 B1 | 5/2012 |
| KR | 1020140008643 A | 1/2014 |
| KR | 10-1389359 B1 | 4/2014 |
| KR | 10-2016-0014458 A | 2/2016 |
| KR | 10-1612979 B1 | 4/2016 |
| KR | 1020160080746 A | 7/2016 |
| WO | 2015/053449 A1 | 4/2015 |
| WO | 2016/108445 A1 | 7/2016 |

OTHER PUBLICATIONS

International Search Report (PCT/ISA/210) dated Dec. 15, 2017 issued by the International Searching Authority in International Application No. PCT/KR2017/009865.
Written Opinion (PCT/ISA/237) dated Dec. 15, 2017 issued by the International Searching Authority in International Application No. PCT/KR2017/009865.
Communication dated Jun. 7, 2019, issued by the European Patent Office in counterpart European Application No. 17849123.9.
Communication dated Oct. 24, 2022 issued by the Intellectual Property Office of the Korean Patent Office in application No. 10-2016-0117387.

* cited by examiner (a)

(b)

DISPLAY DEVICE AND CONTROL METHOD THEREFOR

TECHNICAL FIELD

The disclosure relates to a display device and a control method therefor, and more particularly, to a display device configured to variously change an output of content according to surrounding environmental state and output a result, and a control method therefor.

BACKGROUND ART

A display device selects a channel corresponding to a user command for channel conversion according to the command for channel conversion and outputs image and audio with respect to the content of the selected channel. In other words, a related display device may output the content of the selected channel based on preset output setting information regardless of surrounding environmental state.

Accordingly, user viewing the content of corresponding channel without predicting the output strength of the content of the converted channel may have uncomfortable viewing experience until being accustomed to the output strength of corresponding content.

For example, in case of channel conversion in dark surrounding environment, when content image is displayed with a relatively brighter screen than the content of a previous channel, eyes of the user may not be accustomed to such screen brightness for a certain period of time in which case the user may easily feel fatigue.

DISCLOSURE OF INVENTION

Technical Problem

Accordingly, an object of the disclosure is to provide a display device configured to variously output an output of at least one of image and audio of the content in consideration of surrounding environmental state.

Solution to Problem

In order to accomplish the above-mentioned object, the disclosure provides a display device including a sensor configured to sense surrounding environmental state, an inputter configured to receive input of the user command for content conversion, an outputter configured to output content corresponding to the user command, and a processor configured to control the outputter such that at least one of screen brightness and audio output strength of a second content corresponding to the user command is changed and outputted, when the user command is inputted (or in response to the user command being inputted or based on the user command being inputted), on the basis of at least one of the sensed surrounding environmental state and the output information of currently outputted first.

Further, the sensor includes an illumination sensor configured to sense illumination of surrounding environment, and the processor may control the outputter such that screen brightness of the second content is changed from a first level brightness into a second level brightness based on brightness information included in the output information of the first content and image of the second content is outputted, when an illumination value of the sensed surrounding environment is less than a preset threshold value.

Further, the sensor includes a sound volume sensor configured to sense sound of the surrounding environment inputted through a microphone, and the processor may control the outputter such that audio output strength of audio of the second content is changed from a first level sound volume into a second level sound volume based on audio information included in the output information of the first content and audio of the content is outputted, when a sound volume value with respect to be sound of the sensed surrounding environment is less than a preset threshold value.

Further, the processor may control the outputter such that the screen brightness is maintained at the second level and image of the second content is outputted, when image brightness of the second content is less than a preset threshold value based on image information of the second content.

Further, the processor may control the outputter such that the second audio output strength is maintained at the second level and audio of the second content is outputted, when audio strength of the second content is less than a preset threshold value based on audio information of the second content.

Further, the processor may control the outputter such that at least one of the screen brightness and the audio output strength is changed and outputted within a preset threshold time.

Further, the first level may be output level for outputting the screen brightness and the audio output strength at a preset minimum value, and the second level may be output level for outputting the screen brightness and the audio output strength at the screen brightness and audio output strength of the first content.

Further, the first level may be output level for outputting the screen brightness and the audio output strength at a preset minimum level, and the second level may be information of the screen brightness and the audio output strength that is set based on the surrounding environmental state.

Further, the processor may control the outputter such that output level of at least one of image and audio of the content corresponding to the user command is changed into a preset first level and outputted, when the user command for converting into another content is inputted within a preset threshold time after the first content is converted into the second content.

Further, when a power-on command is inputted with respect to the display device, the processor may control the outputter such that at least one of screen brightness and audio output strength of the content outputted after power-on is changed and outputted, based on at least one of the surrounding environmental state and the output information of the content outputted before the power-on command is inputted.

According to another embodiment, a control method of a display device may include sensing surrounding environmental state, when a user command for content conversion is inputted, changing at least one of screen brightness and audio output strength of a second content corresponding to the user command, on the basis of at least one of the sensed surrounding environmental state and output information of currently outputted first content; and outputting the second content in which at least one of the screen brightness and the audio output strength is changed.

Further, the sensing may include sensing illumination of surrounding environment and the changing may include changing screen brightness of the second content from a first level brightness into a second level brightness based on brightness information included in the output information of the first content, when an illumination value of the sensed surrounding environment is less than a preset threshold value.

Further, the sensing may include sensing sound of surrounding environment, and the changing may include changing audio output strength of the second content from a first level sound volume into a second level sound volume based on audio information included in the output information of the first content, when a sound volume value with respect to sound of the sensed surrounding environment is less than a preset threshold value.

Further, the changing may include maintaining the screen brightness at the second level, when screen brightness of the second content is less than a preset threshold value based on image information of the second content.

Further, the changing may include maintaining the audio output strength at the second level, when audio strength of the second content is less than a preset threshold value based on audio information of the second content.

Further, the changing may include changing at least one of the screen brightness and the audio output strength within a preset threshold time.

Further, the first level may be output level for outputting the screen brightness and the audio output strength at a preset minimum value and the second level may be output level for outputting the screen brightness and the audio output strength at the screen brightness and audio output strength of the first content.

Further, the first level may be output level for outputting the screen brightness and the audio output strength at a preset minimum value and the second level may be information of the screen brightness and the audio output strength that is set based on the surrounding environmental state.

Further, the changing may include changing output level of at least one of image and audio of the content corresponding to the user command into a preset first level, when the user command for converting into another content is inputted within a preset threshold time after the first content is converted into the second content.

Further, the control method includes receiving input of a power-on command with respect to the display device, and the changing may include, when the power-on command is inputted, changing at least one of screen brightness and audio output strength of the content outputted after power-on based on at least one of the surrounding environmental state and the output information of the content outputted before the power-on command is inputted.

Advantageous Effects of Invention

According to the above various embodiments, the display device may variously output an output of at least one of image and audio of the content according to surrounding environmental state.

BRIEF DESCRIPTION OF DRAWINGS

The above and/or other aspects and advantages of the disclosure will become apparent and more readily appreciated from the following detailed description, taken in conjunction with the accompanying drawings, in which.

BEST MODE FOR CARRYING OUT THE INVENTION

Mode for the Invention

Figure 1:
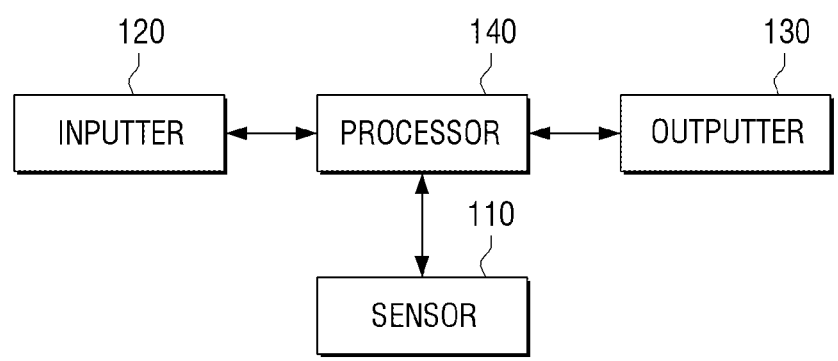
FIG. 1 is a block diagram briefly illustrating a display device according to an embodiment.

Prior to the detailed description of the disclosure, it will be first explained how the embodiments are described and illustrated.

General terms are selected for use in the description and the claims in consideration of functions of various embodiments of the disclosure. However, the terms may be understood differently according to intention of a person skilled in the art, interpretation of law or technology, emergence of new technology or the like. Further, some terms may be arbitrarily designated by the applicant. Such terms may be construed as the meaning defined in this description. Without specifically defined herein, the terms may be understood based on the overall description of the disclosure and common technology related in the art.

Further, the same reference numerals or signs in the drawings attached to the description refer to components or units performing the substantially same functions. For convenience of explanation and understanding, the same reference numerals or signs may be used and described in different embodiments to each other. In other words, even though units having the same drawing reference numeral are all illustrated in a plurality of drawings, a plurality of drawings may not represent one embodiment.

Further, ordinal terms such as "first," "second" or the like for distinguishing between constituent elements in the description and the claims may be used. Such ordinals may be used for distinguishing same or similar constituent elements from each other, and meaning of the terms should not be limited to be construed due to use of the ordinals. For example, constituent elements combined with these ordinals may not be limited in the number or order they are provided due to figures represented by the ordinals. According to necessity, each ordinal may be replaced and used.

Singular expression used herein includes plural expression unless specifically indicated otherwise in view of context. In the disclosure, terms such as "include" or "constitute" should be understood as designating presence of features, numbers, processes, operations, constituent elements, components or combination thereof described in the description, not as previously excluding presence or possibility of adding one or more other features, numbers, processes, operations, constituent elements, components or combination thereof.

According to an embodiment, terms such as "module," "unit," "part" or the like are used to designate a constituent element performing at least one function or operation, and such constituent element may be implemented to be hardware, software or combination of hardware and software. Further, except for when a plurality of "modules," "units," "parts" or the like respectively need to be implemented in specific separate hardware, they may be implemented in at least one processor (not illustrated) as at least one integrated module or chip.

Further, according to an embodiment, when it is described that one portion is connected to another, this includes indirect connection through another medium as well as direct connection. Further, when it is described that a certain portion includes a certain constituent element, unless specifically state otherwise, this means that another constituent element may be further included rather than excluding another constituent element.

The following will specifically explain various embodiments of the disclosure with reference to attached drawings.

FIG. 1 is a brief block diagram of a display device according to an embodiment.

As illustrated in FIG. 1, the display device includes a sensor 110, an inputter 120, an outputter 130 and a processor 140.

The sensor 110 senses surrounding environmental state. Herein, the surrounding environmental state may be at least one of illumination of the surrounding environment and sound generated in the surrounding environment.

The inputter 120 may receive input of the user command from inputting means such as a manipulation unit (or manipulator) (not illustrated) or a touch panel (not illustrated) included in the display device and deliver the received command to the processor 140. Herein, the user command may be a command for channel conversion, a command for content conversion, a command for playing previously stored content, and a control command for controlling operation of the display device.

The outputter 130 may output the content corresponding to the user command. Herein, the content may include at least one of audio and video data. Accordingly, the outputter 130 may output a broadcasting content including audio and image data which are signal-processed into a form that can be outputted.

The processor 140 may control the outputter 130 to gradually change screen brightness and audio output strength of the content (hereinbelow, "second content") corresponding to the user command according to surrounding environmental state sensed by the sensor 110 and output information of the currently outputted content ("first content" hereinbelow) and to output second content. Accordingly, the outputter 130 may gradually change and output audio sound volume and image screen brightness of the second content corresponding to the user command.

Figure 2:
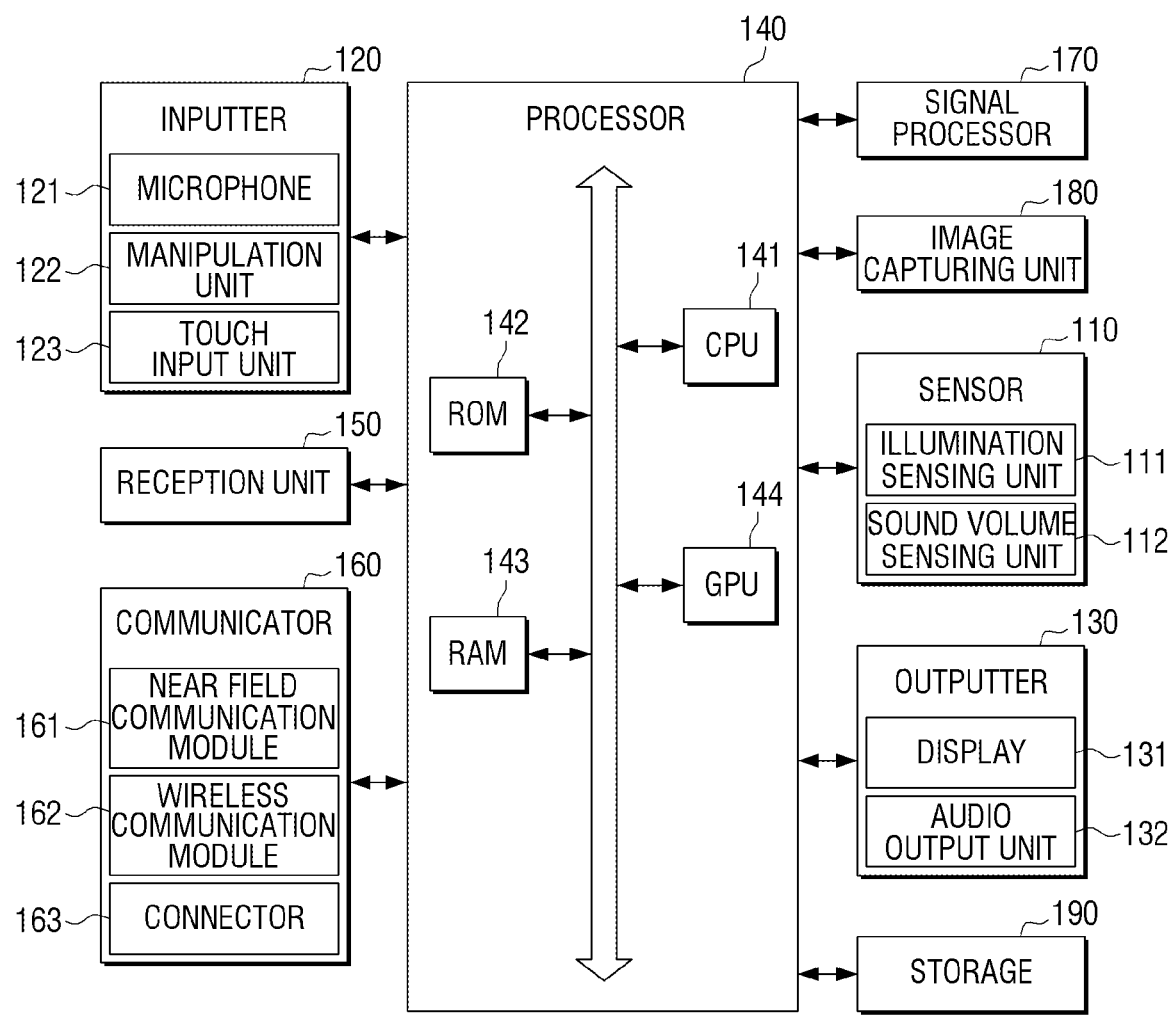
FIG. 2 is a detailed block diagram of a broadcasting receiving device according to an embodiment.

Specifically, the sensor 110 may include an illumination sensor 111 configured to sense illumination of surrounding environment and a sound volume sensor 112 configured to sense sound of surrounding environment inputted through a microphone (not illustrated), as illustrated in FIG. 2 which will be described below.

Accordingly, when the user command for content conversion is inputted, the processor 140 may control the outputter 130 to gradually change at least one of screen brightness and audio output strength of the second content corresponding to the user command based on at least one of surrounding environmental state sensed through at least one of the illumination sensor 111 and the sound volume sensor 112 and output information of currently outputted first content and to output it.

Herein, output information of the first content may be brightness information and audio information with respect to image and audio of the first content.

However, the disclosure is not limited hereto; when inputting a control command such as section jumping of the currently viewed first content, the processor 140 may control the outputter 130 to gradually change at least one of screen brightness and audio output strength according to the surrounding environmental state sensed through at least one of the illumination sensor 111 and the sound volume sensor 112 and to output image frame of a section corresponding to the user command.

According to an embodiment, when an illumination value of the surrounding environment sensed through the illumination sensor 111 is less than a preset threshold value, the processor 140 may control the outputter 130 to change screen brightness of the second content corresponding to the user command from a first level brightness into a second level brightness based on brightness information included in the output information of currently outputted first content and to output image of the second content.

Accordingly, the outputter 130 may gradually change screen brightness into a second level brightness corresponding to brightness level of image of currently outputted first content at the first level and display image of the second content requested by the user.

According to another embodiment, when a sound volume value of sound of the surrounding environment sensed through the sound volume sensor 112 is less than a preset threshold value, the processor 140 may control the outputter 130 to change audio output strength of the second content corresponding to the user command based on audio information included in the output information of currently outputted first content into a second level sound volume from that of the first level and to output audio of the second content.

Accordingly, the outputter 130 may gradually change audio output into a sound volume value of a second level corresponding to audio output level of currently outputted first content at the first level and output audio of the content requested by the user.

According to another embodiment, an illumination value of the surrounding environment sensed through the illumination sensor 111 may be less than a preset threshold value and a sound volume value with respect to sound of the surrounding environment sensed through the sound volume sensor 112 may be less than a preset threshold value. Herein, each threshold value is a reference value for determining whether an illumination value of surrounding environment and a sound volume value with respect to sound of surrounding environment are greater than a reference value, and preferably, each threshold value may be set to be different value.

As described, when an illumination value and a sound volume value of surrounding environment are less than a preset threshold value, the processor 140 may control the outputter 130 to change the screen brightness of image of the second content corresponding to the user command from a first level brightness to that of the second level based on the brightness information and audio information included in the output information of currently outputted first content, change audio output strength of audio of the second content from a first level sound volume into that of the second level, and output a result.

Accordingly, the outputter 130 may gradually change screen brightness into a second level brightness corresponding to a brightness level of image of currently outputted first content at the first level and display image of the second content. Simultaneously, the outputter 130 may gradually change audio output into a sound volume value of a second level corresponding to output level of audio of currently outputted first content at the first level and output audio of the second content.

According to another embodiment, when image brightness of the second content is less than a preset threshold value based on image information of the second content requested by the user, the processor 140 may control the outputter 130 to output image of the content while maintaining screen brightness at the second level.

Specifically, an illumination value of the surrounding environment sensed through the illumination sensor 111 may be less than a preset threshold value. In this case, as described above, the processor 140 may determine whether brightness of image of the second content is less than a preset threshold value by analyzing image information of the second content requested by the user before changing screen brightness of the second content into a second level brightness from that of the first level based on output information of the currently outputted first content, as described above. As a result of determining, when brightness of image of the second content requested by the user is less than a preset threshold value, the processor 140 may control the outputter 130 to output screen brightness of image of the second content at the second level corresponding to brightness level of image of currently outputted first content.

Accordingly, the outputter 130 may output image of the second content at screen a second level brightness corresponding to brightness level of image of currently outputted first content regardless of illumination of the surrounding environment.

According to another embodiment, when audio strength of the second content is less than a preset threshold value based on audio information of the second content requested by the user, the processor 140 may control the outputter 130 to output audio of the second content at the second level corresponding to output level of audio of currently outputted first content. Specifically, a sound volume value of sound of the surrounding environment sensed through the sound volume sensor 112 may be less than a preset threshold value. In this case, the processor 140 may determine whether audio output strength of the second content is less than a preset threshold value by analyzing audio information of the second content requested by the user before changing audio output strength into a second level sound volume corresponding to audio output level of the currently outputted first content at the first level. As a determining result, when audio output strength of the second content is less than a preset threshold value, the processor 140 may control the outputter 130 to output audio output strength of audio of the second content at the second level corresponding to output level of audio of currently outputted first content.

Accordingly, the outputter 130 may output audio of the second content at the second level sound volume corresponding to output level of audio of currently outputted first content regardless of sound of the surrounding environment.

Meanwhile, the first and second levels described above may be set according to a following embodiment.

According to an embodiment, a first level may be output level for outputting screen brightness and audio output strength at a preset minimum value, and a second level may be output level information for outputting at screen brightness and audio output strength of currently outputted first content.

According to another embodiment, a first level may be output level for outputting screen brightness and the audio output strength at a preset minimum value, and a second level may be information in which screen brightness and the audio output strength are set based on the surrounding environmental state.

Meanwhile, the processor 140 may control the outputter 130 to change at least one of screen brightness and audio output strength into a second level from a first level and output a result within a preset threshold time.

According to a control command, the outputter 130 may change at least one of screen brightness and audio output strength from a first level into a second level and output at least one of image and audio of the second content requested by the user within a preset threshold time.

Meanwhile, the processor 140 may determine whether the user command for converting into another content ("third content" hereinbelow) within a preset threshold time after the first content is converted into the second content according to the user command. As a result of determining, when inputting the user command for converting into third content within a preset threshold time after the first content is converted into the second content, the processor 140 may control the outputter 130 to change output level of at least one of image and audio of the third content into a preset first level and output a result.

While at least one of image and audio of the third content is outputted at screen brightness or audio output strength of a first level, the processor 140 may determine whether the user command for converting into another content is inputted within a preset threshold time after being converted into the third content is inputted.

As a result of determining, when the user command for converting into another content is not inputted within a preset threshold time after being converted into the third content, the processor 140 may control the outputter 130 to gradually change screen brightness or audio output strength from a first level to a second level and output the content. Herein, the second level may be output level corresponding to brightness level of image and output level of audio included in the output information of the second content which is outputted before being converted into the third content.

Accordingly, the outputter 130 may gradually change at least one of screen brightness and audio output strength from a first level to a second level and output the third content.

According to an added embodiment of the disclosure, when a power-on command with respect to the display device is inputted, the processor 140 may control the outputter 130 to gradually change at least one of screen brightness and audio output strength of the content which is outputted after power-on based on at least one of surrounding environmental state and output information of the content which is outputted before the power-on command is inputted and output a result.

Specifically, when a power-on command with respect to the display device is inputted, the processor 140 may operate the sensor 110 in activating mode. Accordingly, the sensor 110 may convert mode into the activating mode and sense surrounding environmental state. However, the disclosure is not limited hereto; when a power-on command with respect to the display device is inputted, the processor 140 may operate the communicator 160 to be described below in activating mode. Accordingly, the communicator 160 may receive sensing information sensed from a neighboring terminal device (not illustrated) by performing data communication with the neighboring terminal device (not illustrated) sensing surrounding environmental state.

As described above, when surrounding environmental state is sensed or received from the neighboring terminal device (not illustrated), the processor 140 may control the outputter 130 to gradually change screen brightness and audio output strength of the content which is outputted after power-on based on at least one of surrounding environmental state and output information of the content which is outputted before the power-on command is inputted.

In summary, the above describes operations of the sensor 110, the inputter 120, the outputter 130, and the processor 140 which constitute the display device according to an embodiment.

The following will specifically explain constitution of the broadcasting receiving device 100, which is previously described, with reference to FIG. 2.

FIG. 2 is a detailed block diagram of a broadcasting receiving device according to an embodiment.

As illustrated in FIG. 2, the broadcasting receiving device 100 may further include a reception unit 150 (or receptor), a communicator 160, a signal processor 170, an image capturing unit 180, and a storage 190 in addition to the sensor 110, the inputter 120, the outputter 130, and the processor 140 which are described above.

The reception unit 150 may receive the content of a channel selected by the user among a plurality of contents provided from a broadcasting server (not illustrated). Specifically, the reception unit 150 may select a channel requested by the user through a tuner (not illustrated), and receive various contents such as ground wave broadcasting content or cable broadcasting content provided from the broadcasting server (not illustrated) through the selected channel.

The communicator 160 may receive the content requested by the user by performing communication wiry or wirelessly with the content server (not illustrated) providing the content or receive the user command by performing communication with a remote control device (not illustrated) controlling operation of the display device. Herein, the user command may be a command for channel conversion, a playing command with respect to a previously stored content, a control command for controlling operation of the display device or the like.

Further, the communicator 160 may receive sensing information with respect to the surrounding environmental state sensed in the neighboring terminal device (not illustrated) by performing data communication with the neighboring terminal device (not illustrated).

The communicator 160 may include near field wireless communication module 161, wireless communication module 162, and a connector 163 including at least one of high-definition multimedia interface (HDMI), universal serial bus (USB), Institute of Electrical and Electronics Engineers (IEEE) 1394 or the like.

The near field communication module 161 is unit to perform near field communication wirelessly between the display device and the neighboring terminal device (not illustrated). Such near field wireless communication module 161 may include at least one of Bluetooth module, infrared data association (IrDA) module, near field communication (NFC) module, WIFI module, and Zigbee module.

The wireless communication module 162 is module to perform communication by being connected to an external network according to wireless communication protocol such as IEEE or the like. Besides, the wireless communication module may further include mobile communication module to perform communication by being connected to mobile communication network according to various mobile communication standards such as $3^{rd}$ Generation (3G), $3^{rd}$ Generation Partnership Project (3GPP), long term evolution (LTE), or the like.

As described above, the communicator 160 may be implemented with the various near field communication methods described above, and according to necessity, another communication technology which is not mentioned in this description may be applied.

Meanwhile, the connector 163 is unit to provide interface with various source devices such as USB 2.0, USB 3.0, HDMI, IEEE 1394 or the like. Such connector 163 may receive content data transmitted from the content providing server (not illustrated) through a wire cable connected to the connector 163, or transmit a previously stored content data to external recording medium. Further, the connector 163 may receive input of electrical power from the electrical source through the wire cable physically connected to the connector 163.

The signal processor 170 may be unit to process image data and audio data of the content received externally or the content stored in the storage 190 according to a control command of the processor 140. Specifically, the signal processor 170 may perform various image processes such as decoding, scaling, noise filtering, frame rate converting, resolution converting, or the like with respect to image data included in the content. Further, the signal processor 170 may perform various audio signal processes such as decoding, amplifying, noise filtering, or the like with respect to audio data included in the content.

The image capturing unit 180 may photograph still image or image according to the user command. Accordingly, the processor 140 may control the outputter 130 to determine surrounding environmental state from images photographed through the image capturing unit 180 as well as the surrounding environmental state sensed through the sensor 110, and gradually change screen brightness and audio output strength based on a determining result and output the content.

Meanwhile, as described above, the sensor 110 sensing surrounding environmental state includes an illumination sensor 111 and a sound volume sensor 112. The illumination sensor 111 may sense illumination of surrounding environment and the sound volume sensor 112 may sense sound of the surrounding environment inputted through a microphone (not illustrated). The sensor 110 sensing illumination and sound of the surrounding environment through the illumination sensor 111 and the sound volume sensor 112 may sense various operation states and user interaction of the display device. Specifically, when the display device is a mobile device such as smart phone, the sensor 110 may sense inclination of the display device grabbed by the user based on rotation movement or gravity direction by using at least one of various sensor such as a geomagnetic sensor, a gyro sensor, an acceleration sensor or the like, and the processor 140 may perform control operation intended by the user based on inclination sensed through the sensor 110.

Meanwhile, the inputter 120 receiving input of the user command as described above includes a microphone 121, a manipulation unit 122 (or manipulator) and a touch inputter 123.

The microphone 121 may receive audio signals such as sound generated at the surrounding environment and voice uttered by the user, and divide and output the inputted audio signals by a frame of a preset time unit. Accordingly, the sound volume sensor 112 may analyze each frame constituting the audio signals outputted from the microphone 121 and calculate a sound volume value with respect to sound generated at the surrounding environment.

The manipulation unit 122 may be implemented to be key pad including various functions keys, number keys, special keys, character keys or the like. When the display 131 to be described below is implemented to be touch screen form, the touch inputter 123 may be implemented to be touch pad forming interlayer structure with the display 131. In this case, the touch inputter 123 may receive input of a touch command with respect to the displayed icon through the display 131 to be described below.

Meanwhile, as described above, the outputter 130 outputting the content corresponding to the user command may include a display 131 and an audio outputter 132.

The display 131 may display image of the content corresponding to the user command and the audio outputter 132 may output audio of corresponding content in audible form through a speaker (not illustrated).

The display 131 displaying image of the content may be implemented to be a liquid crystal display (LCD), an organic light emitting display (OLED), a plasma display panel (PDP) or the like. Specifically, the display 131 may be implemented to be touch screen form forming interlayer structure with the touch inputter 123.

As described above, the processor 140 may control the outputter 130 to gradually change output level of at least one of screen brightness and audio output strength of the second content requested by the user based on at least one of the surrounding environmental state sensed through the sensor 110 and output information of currently outputted first content and output a result.

According to a control command, the display 131 may gradually change screen brightness into a second level brightness corresponding to a brightness level of image of currently outputted first content at the first level, and display image of the second content requested by the user. Further, the audio outputter 132 may gradually change audio output strength into a second level sound volume corresponding to audio output level of currently outputted first content at the first level, and output audio of the second content requested by the user in audible form through the speaker (not illustrated).

The storage 190 may store analyzing module for changing at least one of screen brightness and audio output strength in stages by analyzing the surrounding environmental state. Accordingly, the processor 140 may control the outputter 130 to gradually change screen brightness and audio output strength according to the surrounding environmental state sensed by the sensor 110 in utilization of the analyzing module stored in the storage 190 and output the content requested by the user.

The storage 190 storing the analyzing module may store operation system programs for controlling operation of the display device and application programs managed by the operation system, performing operation of the display device by using resources of the operation system and providing user interface.

Herein, when the display device is turned on, the operation system may be programs read in the storage 190 and complied, and operating each unit of the display device. Further, the application programs may be read from the storage 190 by the operation system according to an executing command of the user, shifted in an executable form, and perform various operations. Further, the storage 190 may store various multimedia data, content data, and received data from an external source which are processed by the processor 140.

As described above, the storage 190 may be implemented to be at least one of ROM, RAM, memory card that can be detached/attached to the display device (e.g., SD card, memory stick), non-volatile memory, volatile memory, hard disk drive (HDD) or solid state drive (SSD).

Meanwhile, the processor 140 described above may include CPU 141, ROM 142, RAM 143 and GPU 145, and CPU 141, ROM 142, RAM 143 and GPU 145 may be connected through a bus.

CPU 141 may access the storage 190 and perform booting by using the operation system programs stored in the storage 190. Further, CPU 141 may perform various operations by using various programs, contents, data or the like which are stored in the storage 190.

ROM 142 may store a command set for system booting. When a turn-on command is inputted and the electrical power is supplied, CPU 141 may copy OS stored in the storage 130 to RAM 143 according to the stored command in ROM 142, and boot the system by implementing OS. When booting completes, CPU 141 may copy various programs stored in the storage 190 to RAM 143, and perform various operations by implementing the programs copied to RAM 143.

GPU 144 may generate display screen including various objects such as icon, image, text or the like. Specifically, GPU 144 may calculate feature values such as coordinate values, forms, sizes, colors or the like in which each object is displayed according to layout of screen based on the received control command, and generate display screen of various layouts including objects based on the calculated feature values.

The processor 140 may be implemented to be single-chip system (system-on-a-chip or system on chip, SOC, SoC) by being coupled with the various units described above.

The above specifically explains each unit of the display device according to an embodiment. The following will specifically explain operation of gradually changing at least one of screen brightness and audio output strength of the display device according to surrounding environmental state in the display device and outputting the content requested by the user.

Figure 3:
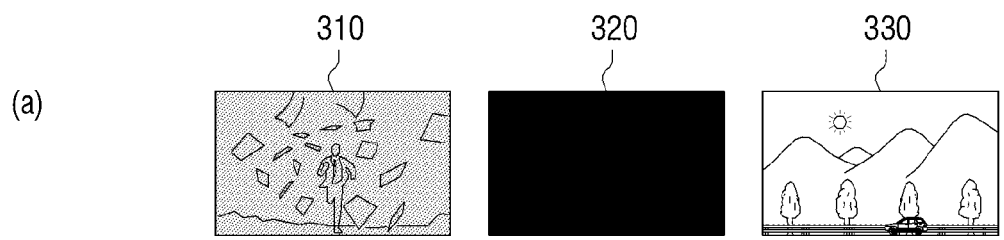
FIG. 3 is an exemplary diagram illustrating that a related display device outputs content of a converted channel.
Figure 3:
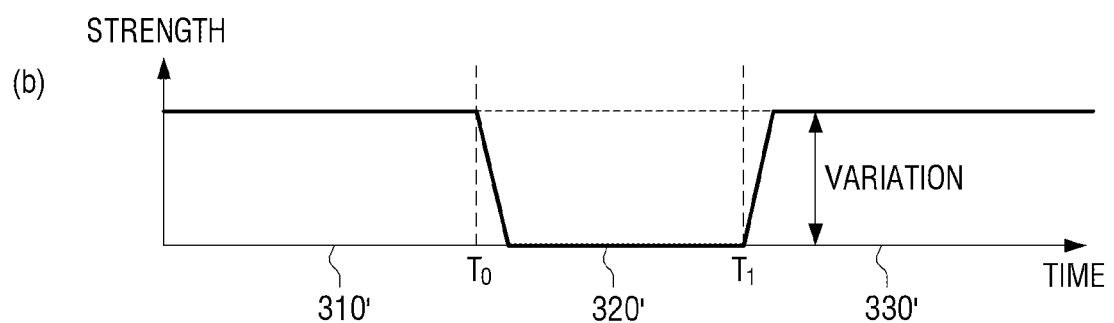

FIG. 3 is an exemplary diagram illustrating that a related display device outputs the content of a converted channel.

FIG. 3A is an exemplary diagram illustrating that a related display device performs channel converting into a channel corresponding to the user command, and FIG. 3B is an exemplary diagram illustrating at least one output variation among image and audio of the content of a channel corresponding to the user command in a display device.

For example, when a command for channel conversion is inputted in state of displaying image of the content 310 of a first channel, the display device may display image of the content 330 of a second channel corresponding to the command for channel conversion. Herein, the display device may display stand-by screen 320 while a channel is converted from a first channel to a second channel.

In other words, the display device may display image of the content 310 of a first channel at the second level which is preset brightness for a first section 310' to the time point T0 when a command for channel conversion into a second channel is inputted, as illustrated in FIG. 3B. Further, when a command for channel conversion into a second channel is inputted, the display device may display the stand-by screen 320 for a second section 320' to the time point T1 when a channel is converted into a second channel from the time point T0 when a command for channel conversion into a second channel is inputted, and display content image 330 of a second channel for a third section 330' after the time point T1 when a channel is converted into a second channel.

In the above, the display device may change screen brightness of the content image 330 of a second channel into a second level which is preset brightness at the time point T1 of converting a channel into a second channel after the second section 320 of displaying the stand-by screen 320 and output a result.

As described above, a related display device may output content image of a channel corresponding to a command for channel conversion of the user at a preset level of screen brightness in dark surrounding environment. Accordingly, the user may feel fatigue because he may not be accustomed to screen brightness with respect to content image of a converted channel when a channel is converted.

Figure 4:
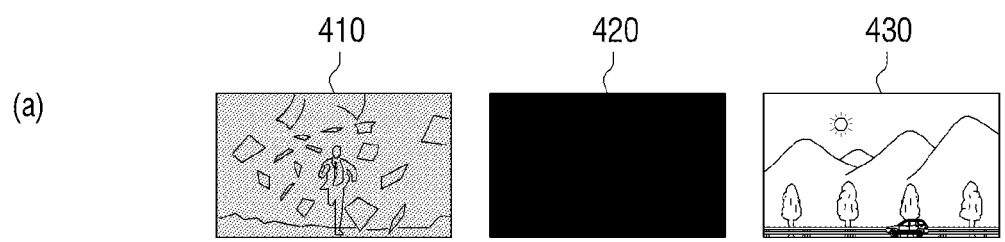
FIG. 4 is a first exemplary diagram illustrating that a display device of an embodiment outputs content according to surrounding environmental state.
Figure 4:
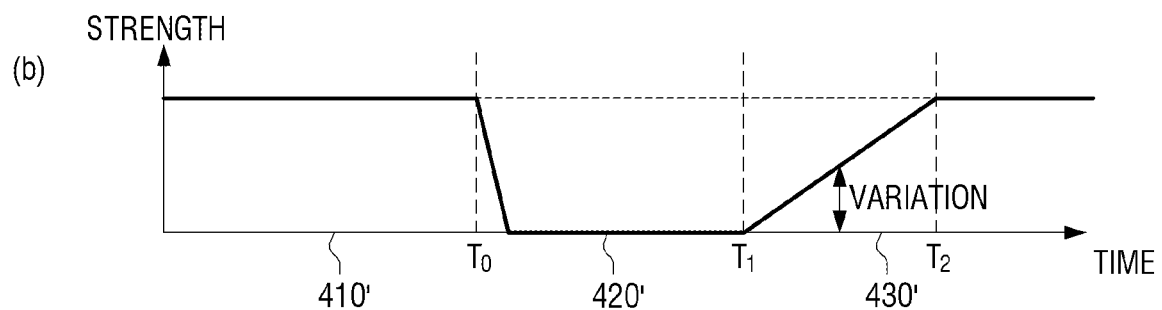

FIG. 4 is an exemplary diagram illustrating that a display device of an embodiment outputs the content according to surrounding environmental state.

FIG. 4A is a first exemplary diagram illustrating that a display device of an embodiment performs channel converting into a channel corresponding to the user command, and FIG. 4B is an exemplary diagram illustrating variation of screen brightness of content image of a channel corresponding to the user command according to surrounding environmental state.

For example, when a command for channel conversion is inputted while content 410 image of a first channel is displayed, the display device may analyze the surrounding environmental state sensed through the sensor 110. As a result of analyzing, when an illumination value of the surrounding environment is less than a preset threshold value, the display device may gradually change screen brightness of content 430 image of a second channel corresponding to a command for channel conversion and display a result.

Specifically, the display device may display content 410 image of a first channel at the second level which is preset brightness for a first section 410' to the time point T0 when a command for channel conversion into a second channel is inputted, as illustrated in FIG. 4B.

However, the disclosure is not limited hereto. The display device may display content 410 image of a first channel at a lower brightness level than a preset second level brightness when image brightness of the content is less than a preset threshold value based on image information of the content 410 of a first channel.

When a command for channel conversion into a second channel is inputted while content 410 image of a first channel is displayed, the display device may analyze the surrounding environmental state sensed through the sensor 110. As a result of analyzing, when an illumination value of the surrounding environment is less than a preset threshold value, the display device may gradually change screen brightness of content 430 image of a second channel for a third section 430' after the time point T1 of converting a channel into a second channel and display a result.

Meanwhile, a section from the time point T0 of inputting a command for channel conversion to the time point T1 of converting a channel into a second channel corresponding to the inputted command for channel conversion is a second section 420', and the second section 420' may be section when the stand-by screen 420 is generated while a channel is converted from a first channel into a second channel.

Accordingly, the display device may gradually change screen brightness of content 430 image of a second channel from a first brightness level into a preset second level brightness at the time point T1 of converting a channel into a second channel after a second section 420' of displaying the stand-by screen 420 and output a result. Specifically, the display device may gradually change screen brightness into a second level brightness from a first level to the time point T2 of closing a preset threshold time from the time point T1 of converting a channel into a second channel for a third section 430' of displaying content 430 image of a second channel which is channel-converted, and display content 430 image of a second channel. Further, the display device may display content 430 image of a second channel while maintaining screen brightness at the second level brightness after the time point T2 of closing a preset threshold time. Herein, a second level brightness may be brightness of an output level corresponding to brightness level of content 410 image of a first channel before a channel is converted into a second channel.

As described above, the display device according to an embodiment may adaptively change screen brightness of content image of a channel corresponding to a command for channel conversion of the user according to the environment having dark neighboring place. Therefore, the user may view content image of a converted channel without another.

Figure 5:
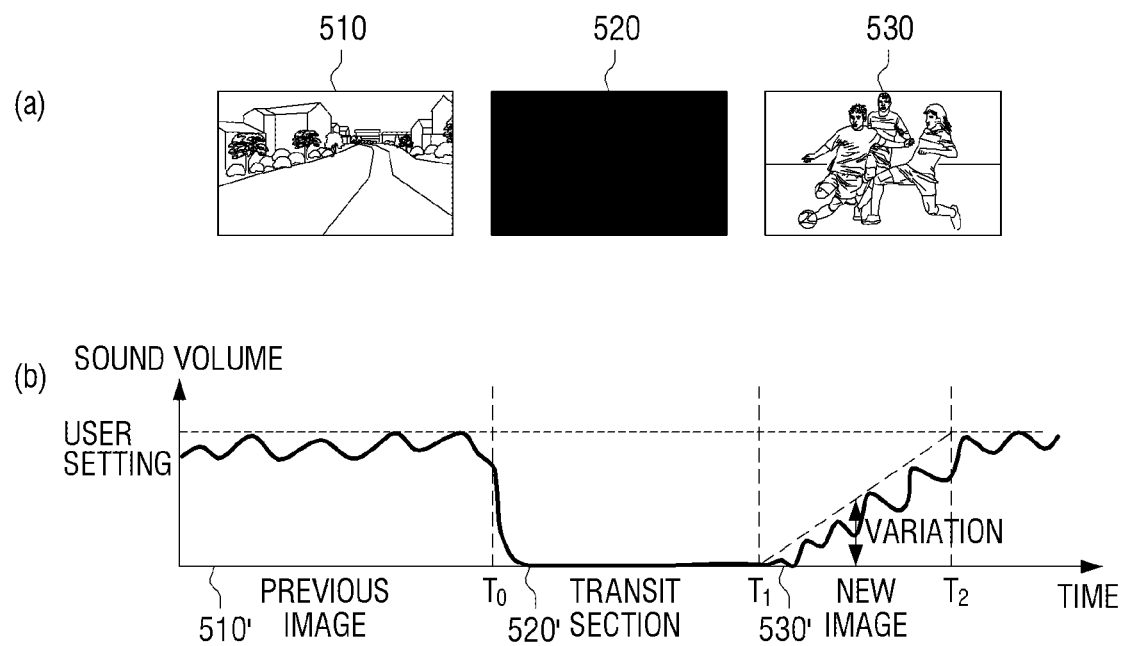
FIG. 5 is a second exemplary diagram illustrating that a display device of an embodiment outputs content according to surrounding environmental state.

FIG. 5 is a second exemplary diagram illustrating that a display device of an embodiment outputs the content according to surrounding environmental state.

FIG. 5A is an exemplary diagram illustrating that the display device of an embodiment performs channel converting into a channel corresponding to the user command, and FIG. 5B is an exemplary diagram illustrating variation of audio output strength of the content of a channel corresponding to the user command according to surrounding environmental state.

For example, when a command for channel conversion is inputted in state of outputting audio of the content 510 of a first channel, the display device may analyze the surrounding environmental state sensed through the sensor 110. As a result of analyzing, when a sound volume value of sound of the surrounding environment is less than a preset threshold value, the display device may gradually change audio output strength of content 530 audio of a second channel corresponding to a command for channel conversion and output a result.

Specifically, the display device may output content 510 audio of a first channel at audio output strength of a preset second level for a first section 510' to the time point T0 when a command for channel conversion into a second channel is inputted, as illustrated in FIG. 5B.

However, the disclosure is not limited hereto. The display device may output content 510 audio of a first channel at a lower level of audio output strength than a preset second level when audio strength of corresponding content is less than a preset threshold value based on audio information of the content 510 of a first channel.

When a command for channel conversion into a second channel is inputted while content 510 audio of a first channel is outputted, the display device may analyze the surrounding environmental state sensed through the sensor 110. As a result of analyzing, when a sound volume value of sound of the surrounding environment is less than a preset threshold value, the display device may gradually change audio output strength of content 530 audio of a second channel for a third section 530' after the time point T1 when a channel is converted into a second channel.

Meanwhile, a section from the time point T0 when a command for channel conversion is inputted to the time point T1 when a channel is converted into a second channel corresponding to the inputted command for channel conversion may be a second section 520', where the stand-by screen 520 is generated when a channel is converted from a first channel into a second channel.

Accordingly, the display device may gradually change audio output strength of content 530 audio of a second channel from a first level into a preset second level at the time point T1 when a channel is converted into a second channel after a second section 520' of displaying the stand-by screen 520, and output a result. Specifically, the display device may gradually change audio size from a first level into a second level of audio output strength during a third section 530' of outputting content 530 audio of a second channel which is channel-converted from the time point T1 when a channel is converted into a second channel to the time point T2 when a preset threshold time closes, and output content 530 audio of a second channel while maintaining a second level of audio output strength after the time point T2 when a preset threshold time closes. Herein, a second level of audio output strength may be output level of strength corresponding to audio output strength in which content 510 audio of a first channel is outputted before a channel is converted into a second channel.

As described above, the display device according to an embodiment may adaptively change and output audio output strength of content audio of a channel corresponding to a command for channel conversion of the user according to sound degree generated at the neighboring place, and therefore, the user may hear content audio of a converted channel without another fatigue.

Figure 6:
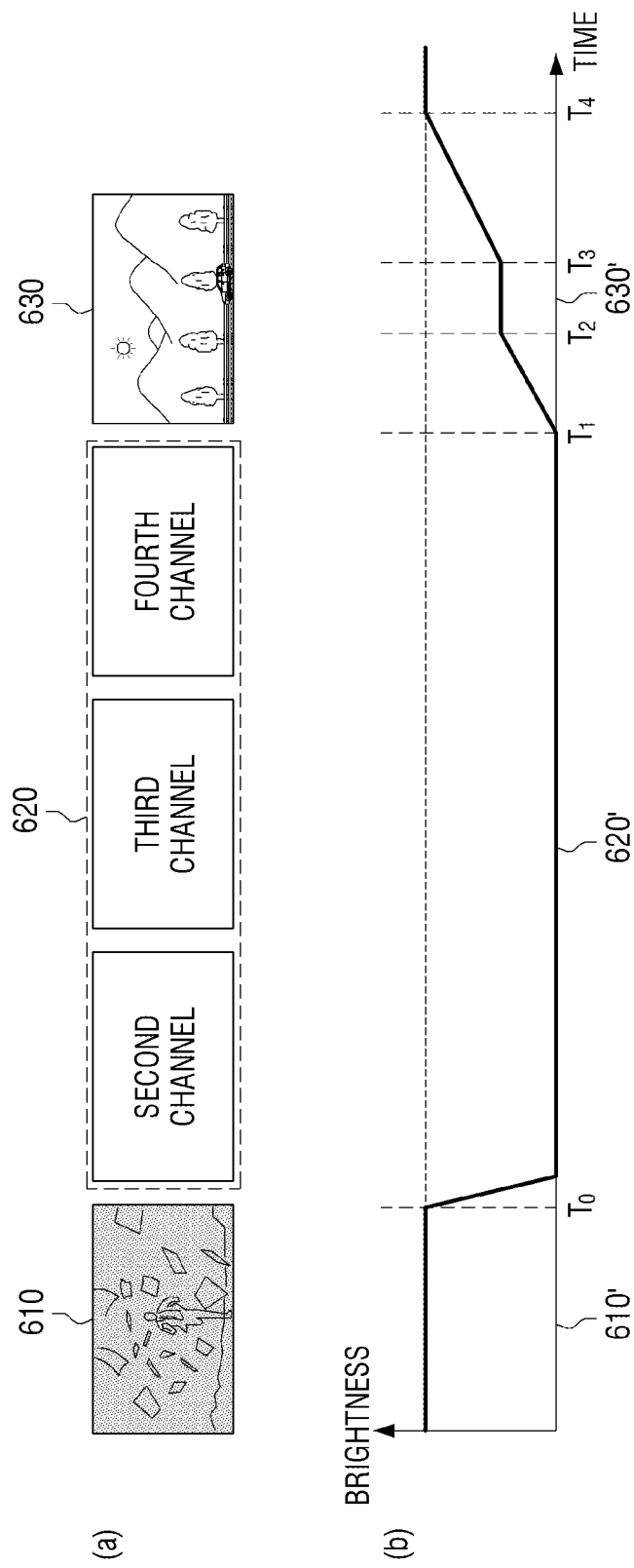
FIG. 6 is a third exemplary diagram illustrating that a display device of an embodiment output content according to surrounding environmental state.

FIG. 6 is a third exemplary diagram illustrating that a display device of an embodiment outputs the content according to surrounding environmental state.

FIG. 6A is an exemplary diagram illustrating that a display device of an embodiment performs channel converting into a channel corresponding to the user command, and FIG. 6B is an exemplary diagram illustrating variation of screen brightness of content image of a channel corresponding to the user command according to surrounding environmental state in a display device.

For example, the display device may receive input of a series of commands for channel conversions while displaying content 610 image of a first channel. Specifically, the display device may continuously receive input of a command for channel conversion with respect to second to fifth channels while content 610 image of a first channel is displayed. When such command for channel conversions are inputted, the display device may analyze the surrounding environmental state sensed through the sensor 110. As a result of analyzing, when an illumination value of the surrounding environment is less than a preset threshold value, the display device may gradually change screen brightness of content 630 image of a fifth channel corresponding to the command for channel conversion inputted last, among a series of commands for channel conversions and display a result.

Specifically, the display device may display content 610 image of a first channel at a preset second level brightness for a first section 610' to the time point T0 when an initial command for channel conversion is inputted, as illustrated in FIG. 6B. Further, when a command for channel conversion is inputted, the display device may analyze the surrounding environmental state sensed through the sensor 110. As a result of analyzing, when an illumination value of the surrounding environment is less than a preset threshold value, the display device may gradually change screen brightness for a third section 630' after the time point T1 when a channel is converted into a fifth channel corresponding to a command for channel conversion inputted last, among a series of commands for channel conversions, and display a result.

Meanwhile, a section from the time point T0 when an initial command for channel conversion is inputted to the time point T1 when a channel is converted into a fifth channel corresponding to a command for channel conversion inputted last, may be a second section 620', which is section of displaying content image of second to fourth channels and stand-by screen 620 including black image generated during channel converting.

Accordingly, the display device may gradually change screen brightness from a preset first level to a second level at the time point T1 when a channel is converted into a fifth channel after the second section 620' of displaying the stand-by screen 620, and display content 630 image of a fifth channel. Herein, a second level brightness may be brightness of an output level corresponding to brightness level of content 610 image of a first channel before a channel is converted into a fifth channel.

Specifically, the display device may gradually change screen brightness from a first level into a middle level less than a preset second level for a section from the time point T1 when a channel is converted into a fifth channel to a preset time point T2, and display content 630 image of a fifth channel. Herein, a second level brightness may be brightness of an output level corresponding to brightness level of content 610 image of a first channel before a channel is converted into a fifth channel.

Hereinafter, the display device may display content 630 image of a fifth channel while maintaining screen brightness at a middle level for preset sections T2~T3. Herein, the preset sections T2~T3 may be sections in which whether to input another command for channel conversion is determined after a command for channel conversion into a fifth channel is inputted.

When another command for channel conversion is inputted for the preset sections T2~T3, the display device may display content image corresponding to another command for channel conversion at a middle level of screen brightness.

Meanwhile, when another command for channel conversion is not inputted for the preset sections T2~T3, the display device may gradually change screen brightness from a middle level into a preset second level for preset sections T3~T4, and display content 630 image of a fifth channel while maintaining screen a second level brightness.

Figure 7:
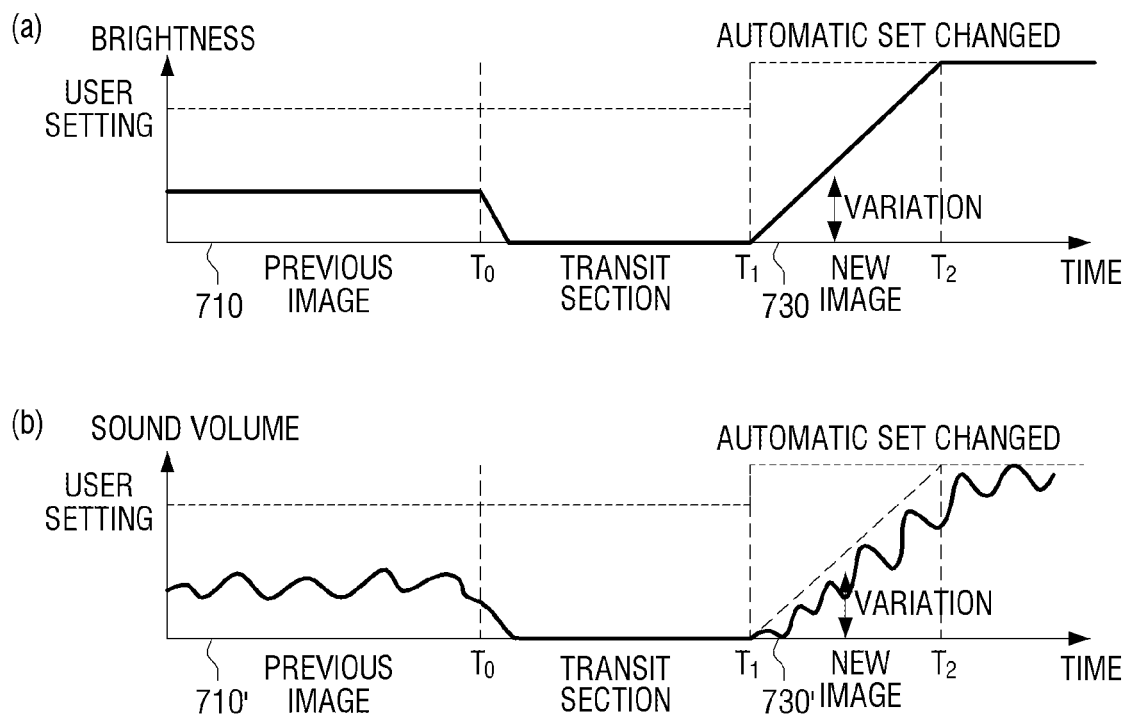
FIG. 7 is a fourth exemplary diagram illustrating that a display device of an embodiment outputs content according to surrounding environmental state.

FIG. 7 is a fourth exemplary diagram illustrating that a display device of an embodiment outputs the content according to surrounding environmental state.

FIG. 7A is an exemplary diagram illustrating variation of screen brightness of content image of a channel corresponding to the user command according to surrounding environmental state, and FIG. 7B is an exemplary diagram illustrating variation of audio output strength of content audio of a channel corresponding to the user command according to surrounding environmental state.

Specifically, as illustrated in FIG. 7A, when a command for channel conversion is inputted while displaying content image of a first channel, the display device may analyze the surrounding environmental state sensed through the sensor 110. As a result of analyzing, when an illumination value of the surrounding environment is less than a preset threshold value, the display device may gradually change screen brightness of content image of a second channel corresponding to a command for channel conversion and display a result.

More specifically, the display device may display corresponding content image at a level lower than a second level preset by the user based on image information of the content of a first channel for a first section 710 to the time point T0 when a command for channel conversion into a second channel is inputted.

When a command for channel conversion into a second channel is inputted while displaying content image of a first channel, the display device may analyze the surrounding environmental state sensed through the sensor 110. As a result of analyzing, when an illumination value of the surrounding environment is less than a preset threshold value, the display device may gradually change screen brightness of content image of a second channel for a third section 730 after the time point T1 when a channel is converted into a second channel, and display a result.

Herein, the display device may compare screen brightness of corresponding content with a preset threshold value based on image information with respect to the content of a second channel. When it is greater than a preset threshold value as a result of comparing, the display device sets screen brightness to be a third level higher than a second level preset by the user.

The display device may gradually change screen brightness into a third level from a first level for sections of T1 to T2 of a third section 730 set by the user, display content image of a second channel, and display content image of a second channel at screen brightness of a third level starting from a section after T1 to T2 sections.

Meanwhile, when the image brightness obtained based on image information of the content of a second channel is less than a preset threshold value, the display device may display content image of a second channel at screen brightness having a level corresponding to image brightness of corresponding content.

Meanwhile, as illustrated in FIG. 7B, when a command for channel conversion is inputted while outputting content audio of a first channel, the display device may analyze the surrounding environmental state sensed through the sensor 110. As a result of analyzing, when a sound volume value of surrounding environment sound is less than a preset threshold value, the display device may gradually change audio output strength of content audio of a second channel corresponding to a command for channel conversion and output a result.

More specifically, the display device may output audio of corresponding content at audio output strength having a level lower than a second level preset by the user based on audio information of the content of a first channel for a first section 710 to the time point T0 when a command for channel conversion into a second channel is inputted.

When a command for channel conversion into a second channel is inputted while outputting content audio of a first channel, the display device may analyze the surrounding environmental state sensed through the sensor 110. As a result of analyzing, when a sound volume value of sound of the surrounding environment is less than a preset threshold value, the display device may gradually change audio output strength for a third section 730 after the time point T1 when a channel is converted into a second channel, and output content audio of a second channel.

Herein, the display device may compare audio output strength of audio of corresponding content with a preset threshold value based on audio information of the content of a second channel. When it is greater than a preset threshold value as a result of comparing, the display device may set audio output strength having a third level higher than a second level preset by the user.

Hereinafter, the display device may gradually change audio output strength from a first level to a third level for T1 to T2 sections of a third section 730 set by the user, output content audio of a second channel, and output content audio of a second channel at a third level of audio output strength starting from a section after T1 to T2 sections.

Meanwhile, when the audio output strength obtained based on audio information with respect to the content of a second channel, the display device may output content audio of a second channel at a level corresponding to audio output strength of corresponding content.

Figure 8:
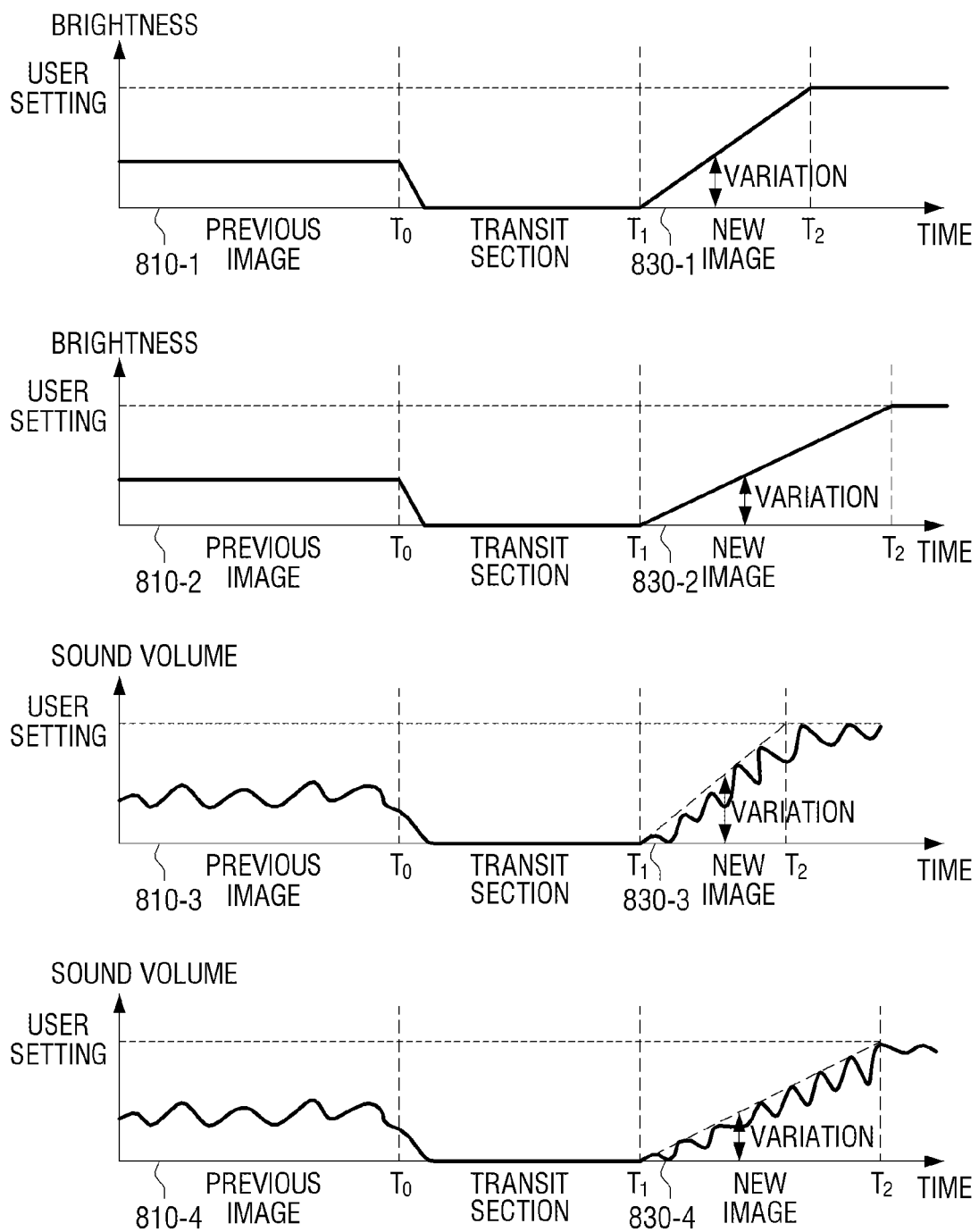
FIG. 8 is an exemplary diagram illustrating that a display device of an embodiment variously changes output strength of the content according to surrounding environmental state.

FIG. 8 is an exemplary diagram illustrating that a display device of an embodiment variously changes output strength of the content according to surrounding environmental state.

As illustrated in FIGS. 8A and 8B, the display device may display corresponding content image at screen brightness having a level lower than a second level preset by the user based on image information with respect to the content of a first channel for a first section 810-1, 810-2 to the time point T0 when a command for channel conversion into a second channel is inputted.

Hereinafter, when a command for channel conversion with respect to a second channel is inputted, the display device may analyze the surrounding environmental state sensed through the sensor 110. When an illumination value of the surrounding environment is less than a preset threshold value as a result of analyzing, the display device may gradually change screen brightness of content image of a second channel for a third section 830-1, 830-2 after the time point T1 when a channel is converted into a second channel, and display a result.

Herein, a third section 830-1, 830-2 may be a level changing section for changing a level of screen brightness with respect to content image, and the user may variously set a level changing section.

As illustrated in FIG. 8A, when a third section 830-1 is set to be a first level changing section, the display device may gradually change screen brightness from a first level into a preset second level for the time corresponding to the first level changing section, and display content image of a second channel.

Meanwhile, as illustrated in FIG. 8B, when a third section 830-2 is set to be a second level changing section, the display device may gradually change screen brightness from a first level to a preset second level for a longer time than the first level changing section of FIG. 8A and display content image of a second channel.

Meanwhile, as illustrated in FIGS. 8C and 8D, the display device may output audio of corresponding content at audio output strength having a level lower than a second level preset by the user based on audio information with respect to the content of a first channel for a first section 810-3, 810-4 to the time point T0 when a command for channel conversion into a second channel is inputted.

Hereinafter, when a command for channel conversion with respect to a second channel is inputted, the display device may analyze the surrounding environmental state sensed through the sensor 110. As a result of analyzing, when a sound volume value of sound of the surrounding environment is less than a preset threshold value, the display device may gradually change audio output strength of content audio of a second channel for a third section 830-3, 830-4 after the time point T1 when a channel is converted into a second channel and output a result.

Herein, a third section 830-3, 830-4 may be a level changing section for changing audio output strength with respect to content audio, and the user may variously set a level changing section.

As illustrated in FIG. 8C, when a third section 830-3 is set to be a third level changing section, the display device may gradually change audio output strength from a first level into a preset second level for the time corresponding to a third level changing section and output content audio of a second channel.

Meanwhile, as illustrated in FIG. 8D, when a third section 830-4 is set to be a fourth level changing section, the display device may gradually change audio output strength from a first level to a preset second level for the time longer than the third level changing section, as in FIG. 8C.

In summary, the above specifically describes operation of changing content image and audio output strength in stages with respect to a converted channel when a channel is converted in the display device and outputting it.

The following will specifically describe a method for changing content image and audio output strength in stages with respect to a converted channel when a channel is converted and outputting thereof in the display device of an embodiment.

Figure 9:
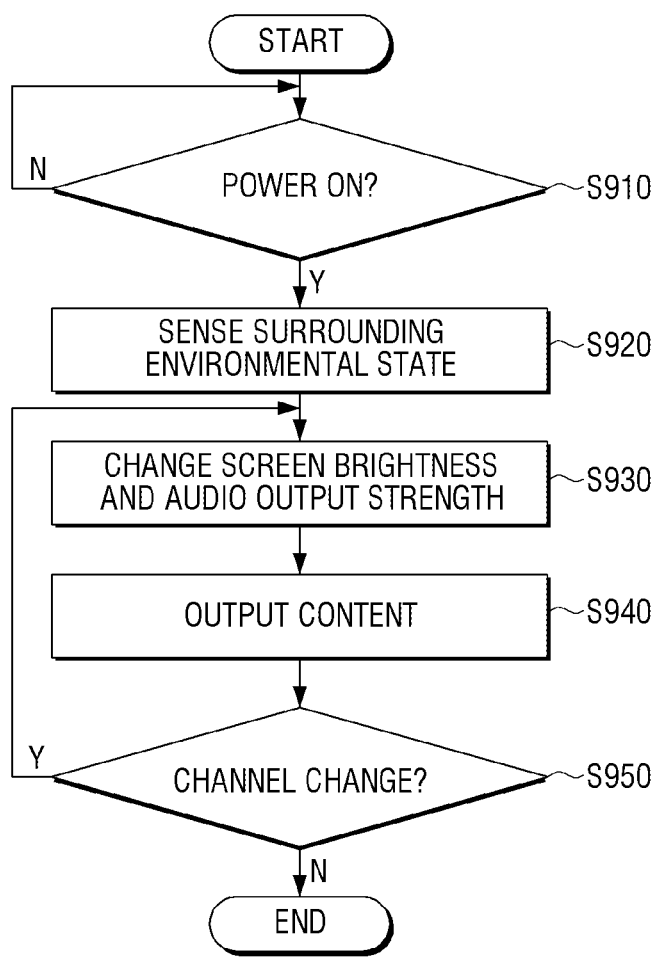
FIG. 9 is a flowchart describing a control method of a display device according to an embodiment.

FIG. 9 is a flowchart describing a control method of a display device according to an embodiment.

As illustrated in FIG. 9, the display device may activate the sensor when a power-on command is inputted and sense surrounding environmental state through the activated sensor at S910 and S920.

However, the disclosure is not limited hereto; when a power-on command is inputted, the display device may activate a communicator, and receive information with respect to the surrounding environmental state sensed by a neighboring terminal device from the neighboring terminal device.

Herein, the surrounding environmental state may be an illumination value of the surrounding environment sensed through an illumination sensor and a sound volume value with respect to sound of the surrounding environment inputted through a microphone.

When sensing or receiving information of such surrounding environmental state from the neighboring terminal device, the display device may gradually change at least one of image and audio of the content outputted after power-on based on at least one of output information of the content outputted before being powered on and the sensed surrounding environmental state and output a result at S930 and S940. In other words, the display device may gradually change at least one of screen brightness and audio output strength of the content outputted after power-on based on at least one of the surrounding environmental state and output information of the content outputted before being powered on and output a result.

While outputting the content ("first content" hereinbelow), the display device may determine whether to input the command for content conversion or not, gradually change at least one output strength among image and audio of the content ("second content" hereinbelow) corresponding to a converting command by re-performing S930 and S940 described above based on at least one of output information of currently outputted first content and surrounding environmental state when the command for content conversion is inputted, and output a result at S950.

Figure 10:
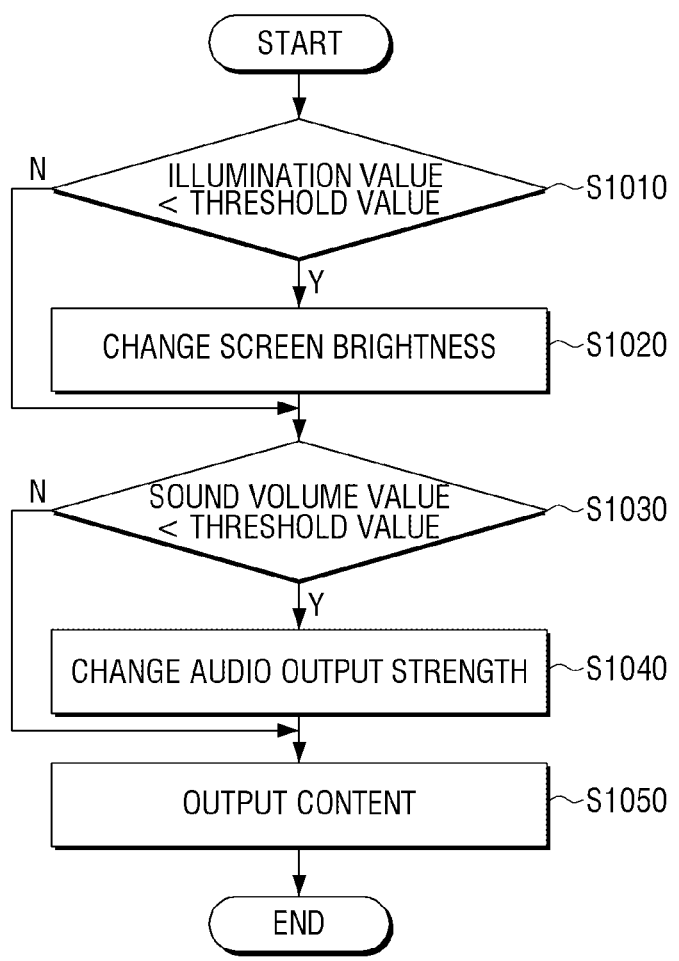
FIG. 10 is a flowchart describing a method for outputting content in a display device of an embodiment according to surrounding environmental state.

FIG. 10 is a flowchart describing a method for outputting the content according to surrounding environmental state in a display device of an embodiment.

As illustrated in FIG. 10, the display device may compare an illumination value of the surrounding environment sensed through an illumination sensor with a preset threshold value when a command for content conversion is inputted at S1010. As a result of comparing, when an illumination value of the surrounding environment is greater than a preset threshold value, the display device may compare sound of the surrounding environment with a preset threshold value at S1030 to be described below.

Meanwhile, when an illumination value of the surrounding environment is less than a preset threshold value, the display device may change screen brightness of image of the second content corresponding to the command for content conversion of the user from a first level brightness into a second level brightness at S1020. Herein, a second level brightness may be output level corresponding to brightness level of image of currently outputted first content. The display device may compare a sound volume value with respect to sound of the sensed surrounding environment with a preset threshold value when sound of the surrounding environment is sensed through a sound volume sensor at S1030. As a result of comparing, when a sound volume value with respect to the sensed sound of the surrounding environment is less than a preset threshold value, the display device may change audio output strength of the second content corresponding to the command for content conversion of the user from a first level sound volume into a second level sound volume at S1040. Herein, audio output strength of a second level may be output level corresponding to audio output level of currently outputted first content.

Hereinafter, the display device may gradually change screen brightness and audio output strength from a first level to a second level and output image and audio with respect to the second content corresponding to the command for content conversion at S1050.

However, the disclosure is not limited hereto; when an illumination value of the surrounding environment among an illumination value and a sound volume value of the surrounding environment sensed through the illumination sensor and the sound volume sensor is less than a preset threshold value, the display device may gradually change screen brightness from a first level into a second level and display image of the second content corresponding to the command for content conversion.

Meanwhile, when a sound volume value with respect to sound of the surrounding environment among an illumination value and a sound volume value of the sensed surrounding environment is less than a preset threshold value, the display device may gradually change audio output strength from a first level into a second level and output audio of the second content corresponding to the command for content conversion.

Meanwhile, the display device may analyze image and audio of the second content before gradually changing at least one of screen brightness and audio output strength of the second content corresponding to the command for content conversion based on at least one of surrounding environmental state and output information of currently outputted first content and outputting it.

According to an embodiment, when an illumination value of the surrounding environment is less than a preset threshold value, the display device may determine whether screen brightness of the second content is less than a preset threshold value based on image information of the second content corresponding to the command for content conversion. As a result of determining, when screen brightness of the second content corresponding to the command for content conversion is greater than a preset threshold value, the display device may gradually change screen brightness from a first level into a second level and display image with respect to the second content.

Meanwhile, when screen brightness of the second content corresponding to the command for content conversion is less than a preset threshold value, the display device may display image of the second content while maintaining screen brightness at a preset second level.

However, the disclosure is not limited hereto; when screen brightness of the second content corresponding to the command for content conversion is less than a preset threshold value, the display device may display image of the second content at screen brightness corresponding to image brightness of the second content.

According to another embodiment, when a sound volume value with respect to sound of the surrounding environment is less than a preset threshold value, the display device may determine whether audio output strength with respect to audio of the second content is less than a preset threshold value based on audio information of the second content corresponding to the command for content conversion. As a result of determining, when audio output strength of audio of the second content corresponding to the command for content conversion is greater than a preset threshold value, the display device may gradually change audio output strength from a first level to a second level and output audio of the second content corresponding to the command for content conversion, as described above.

Meanwhile, when audio output strength with respect to audio of the second content corresponding to the command for content conversion is less than a preset threshold value, the display device may output audio of the second content while maintaining audio output strength at a preset second level.

However, the disclosure is not limited hereto; when audio output strength with respect to audio of the second content corresponding to the command for content conversion is less than a preset threshold value, the display device may output audio of the second content at the audio output strength with respect to audio of the second content.

Meanwhile, the display device may gradually change at least one of screen brightness and audio output strength within a threshold time preset by the user.

Further, the first level described above may be output level for outputting screen brightness to display image of the second content corresponding to the command for content conversion and audio output strength to output audio of the second content at a preset minimum value.

Further, the second level described above may be output level for outputting screen brightness to display image of the second content and audio output strength to output audio of the second content corresponding to the command for content conversion at screen brightness and audio output strength of currently outputted first content. However, the disclosure is not limited hereto; the second level may be output level of setting screen brightness to display image of the second content corresponding to the command for content conversion and audio output strength to output audio of the second content based on the surrounding environmental state.

Meanwhile, the display device may convert the first content into the second content according to the command for content conversion of the user, and change output level of at least one of image and audio of the third content to be a preset first level when the user command for converting into another content is inputted within a preset threshold time.

In other words, the display device may set at least one output level to be a preset first level among screen brightness and audio output strength when a series of commands for channel conversions are inputted. Further, the display device may output at least one of image and audio of the content corresponding to the command for content conversion inputted last, at screen brightness and audio output strength corresponding to a first level. The display device may determine whether or not another command for content conversion is inputted within a preset threshold time. As a result of determining, when another command for content conversion is not inputted within a preset threshold time, the display device may output at least one of image and audio of the content corresponding to the command for content conversion inputted last, at screen brightness or audio output strength corresponding to a preset second level from a first level. Meanwhile, the above described control method of the display device outputting the content may be implemented as a program including algorithms that can be executed on a computer, and the program may be stored and provided on a non-transitory computer readable recording medium.

The non-transitory computer readable recording medium refers to a medium storing data semi-permanently and being read by a device, rather than a medium storing data temporarily such as register, cache, memory or the like. Specifically, the above various applications or programs may be stored and provided on non-transitory computer readable recording medium such as CD, DVD, hard disk, Blu-ray disk, USB, memory card, ROM or the like.

The foregoing embodiments and advantages are merely exemplary and are not to be construed as limiting. The present teaching can be readily applied to other types of apparatuses. Also, the description of the embodiments is intended to be illustrative, and not to limit the scope of the claims, and many alternatives, modifications, and variations will be apparent to those skilled in the art.

The invention claimed is:

1. A display device, comprising:
a sensor configured to sense a surrounding environmental state, wherein the sensor comprises an illuminator sensor configured to sense illumination of a surrounding environment;
an inputter configured to receive an input of a user command for content conversion from a first content to a second content;
an outputter configured to output content corresponding to the user command; and
a processor configured to:
in response to the user command being received, identify whether an illumination value of the surrounding environment is less than a preset illumination threshold value,
based on the illumination value of the surrounding environment is less than the preset illumination threshold value, control the outputter such that a screen brightness of the display device that displays the second content corresponding to the user command is gradually changed from a first level brightness to a second level brightness for a first predefined time period such that the screen brightness is at the first level brightness at an initial time point in the first predefined time period and the screen brightness is at the second level brightness at a final time point in the first predefined time period based on the sensed surrounding environmental and an image brightness of the second content, control the outputter such that, during the first predefined time period, the screen brightness of the display device is maintained at a middle level brightness between the first level brightness and the second level brightness for a second predetermined time period, and in response to another user command for channel conversion not being received during the second predetermined time period, control the outputter such that the screen brightness of the display device is gradually changed from the middle level brightness to the second level brightness such that the screen brightness is at the middle level brightness at a final time point in the second predetermined time period and the screen brightness is at the second level brightness at the final time point in the first predetermined time period.

2. The display device of claim 1, wherein, when the illumination value of the sensed surrounding environment is less than the preset illumination threshold value, the processor controls the outputter such that the screen brightness of the second content is changed from the first level brightness into the second level brightness based on brightness information included in output information of the first content and an image of the second content is outputted.

3. The display device of claim 1, wherein the sensor comprises a sound volume sensor configured to sense sound of the surrounding environment inputted through a microphone, and the processor controls the outputter such that an audio output strength of audio of the second content is changed from a first level sound volume into a second level sound volume based on audio information included in output information of the first content and audio of the content is outputted, when a sound volume value with respect to the sound of the sensed surrounding environment is less than a preset sound threshold value.

4. The display device of claim 2, wherein the processor controls the outputter such that the screen brightness of the display device is maintained at the second level brightness and the image of the second content is outputted, when the image brightness of the second content is less than a preset image brightness threshold value based on image information of the second content.

5. The display device of claim 3, wherein the processor controls the outputter such that a second audio output strength is maintained at the second level sound volume and audio of the second content is outputted, when the audio output strength of the second content is less than a preset audio output threshold value based on the audio information included in the second content.

6. The display device of claim 2, wherein the processor controls the outputter such that at least one of the screen brightness of the second content and an audio output strength is changed and outputted within a preset threshold time.

7. The display device of claim 2, wherein the first level brightness is an output level for outputting the screen brightness of the second content at a preset minimum value, and the second level brightness is an output level for outputting the screen brightness at a screen brightness of the first content.

8. The display device of claim 2, wherein the first level brightness is an output level for outputting the screen brightness of the second content at a preset minimum level, and the second level brightness is information of the screen brightness of the second content that is set based on the surrounding environmental state.

9. The display device of claim 2, wherein the processor controls the outputter such that an output level of at least one of image and audio of the content corresponding to the user command is changed into a preset first level and outputted, when the user command for converting into another content is inputted within a preset threshold time after the first content is converted into the second content.

10. The display device of claim 2, wherein, when a power-on command is inputted with respect to the display device, the processor controls the outputter such that at least one of screen brightness and audio output strength of the content outputted after on the display device is powered on is changed and outputted, based at least one of the surrounding environmental state and output information of the content outputted before the power-on command is inputted.

11. A control method of a display device performed by a processor of the display device, the method comprising:
sensing a surrounding environmental state;
sensing illumination of a surrounding environment;
when a user command for content conversion from a first content to a second content is inputted:
identifying whether an illumination value of the surrounding environment is less than a preset illumination threshold value,
based on the illumination value of the surrounding environment is less than the preset illumination threshold value, gradually changing a screen brightness of the display device that displays the second content corresponding to the user command from a first level brightness to a second level brightness for a first predefined time period such that the screen brightness is at the first level brightness at an initial time point in the first predefined time period and the screen brightness is at the second level brightness at a final time point in the first predefined time period based on the analyzed surrounding environmental state and an image brightness of the second content;
during the first predefined time period, maintaining the screen brightness of the display device at a middle level brightness between the first level brightness and the second level brightness for a second predetermined time period,
in response to another user command for channel conversion not being received during the second predetermined time period, gradually changing the screen brightness of the display device from the middle level brightness to the second level brightness such that the screen brightness is at the middle level brightness at a final time point in the second predetermined time period and the screen brightness is at the second level brightness at the final time point in the first predetermined time period, and
outputting the second content in which the screen brightness is changed.

12. The control method of claim 11, wherein the changing comprises changing the screen brightness of the second content from the first level brightness into the second level brightness based on brightness information included in output information of the first content, when the illumination value of the sensed surrounding environment is less than the preset illumination threshold value.

13. The control method of claim 11, wherein the sensing comprises sensing sound of surrounding environment, and
the changing comprises changing an audio output strength of the second content from a first level sound volume into a second level sound volume based on audio information included in output information of the first content, when a sound volume value with respect to the sound of the sensed surrounding environment is less than a preset sound threshold value.

14. The control method of claim 12, wherein the changing comprises maintaining the screen brightness of the second content at the second level brightness when the screen brightness of the second content is less than a preset image brightness threshold value based on image information of the second content.

15. The control method of claim 13, wherein the changing further comprises maintaining the audio output strength at the second level sound volume when an audio strength of the second content is less than a preset audio output threshold value based on the audio information included in the second content.

\* \* \* \* \*